US010419966B2

(12) United States Patent
Xu et al.

(10) Patent No.: US 10,419,966 B2
(45) Date of Patent: Sep. 17, 2019

(54) BALANCING WIRELESS TERMINAL TRAFFIC

(71) Applicant: Hughes Network Systems, LLC, Germantown, MD (US)

(72) Inventors: Jun Xu, Boyds, MD (US); Robert J. Torres, New Market, MD (US); John L. Border, Middletown, MD (US); Matthew Baer, Gaithersburg, MD (US); Szuyuan Huang, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 30 days.

(21) Appl. No.: 15/639,415

(22) Filed: Jun. 30, 2017

(65) Prior Publication Data
US 2019/0007859 A1    Jan. 3, 2019

(51) Int. Cl.
*H04W 28/02* (2009.01)
*H04W 40/02* (2009.01)
*H04W 40/08* (2009.01)
*H04W 40/12* (2009.01)
H04W 28/08 (2009.01)
H04W 84/06 (2009.01)
H04L 12/803 (2013.01)

(52) U.S. Cl.
CPC ....... *H04W 28/0268* (2013.01); *H04W 40/02* (2013.01); *H04W 40/08* (2013.01); *H04W 40/12* (2013.01); *H04L 47/125* (2013.01); *H04W 28/0284* (2013.01); *H04W 28/085* (2013.01); *H04W 84/06* (2013.01)

(58) Field of Classification Search
CPC .............. H04W 28/085; H04W 28/26; H04W 28/0268; H04W 28/0284; H04W 84/06; H04B 7/18513; H04J 3/1694
See application file for complete search history.

(56) References Cited

U.S. PATENT DOCUMENTS

| 5,898,681 A * | 4/1999 | Dutta ................. H04B 7/18539 370/229 |
| 6,021,309 A * | 2/2000 | Sherman ............ H04B 7/18534 455/12.1 |
| 6,574,797 B1 * | 6/2003 | Naegeli .............. H04N 7/17309 348/192 |

(Continued)

*Primary Examiner* — Michael Thier
*Assistant Examiner* — Nevena Zecevic Sandhu
(74) *Attorney, Agent, or Firm* — Bejin Bieneman PLC

(57) ABSTRACT

A system is described that includes a computer programmed: for each of a plurality of terminals, to receive inroute data via one of a plurality of respective inroute channels; using the plurality of respective inroute channels, to determine a first super inroute group (SIG) and a second SIG based on symbol rates of respective inroute channels; to determine a channel quality value of a first inroute channel, of a first terminal, wherein the first inroute channel is one of the plurality of respective inroute channels; to determine a backlog volume of one of the first SIG or the second SIG; and based on determining the channel quality value of the first terminal and the backlog volume of the first or second SIGs, to transmit, to the first terminal, outroute data comprising an instruction to change to a different inroute channel of the first or second SIG.

20 Claims, 5 Drawing Sheets

(56) References Cited

U.S. PATENT DOCUMENTS

| | | | |
|---|---|---|---|
| 6,834,039 B1* | 12/2004 | Kelly | H01Q 1/1257 370/229 |
| 8,493,877 B1* | 7/2013 | Das | H04W 52/267 370/252 |
| 2003/0112878 A1* | 6/2003 | Kloper | H04B 7/18547 375/259 |
| 2009/0131046 A1* | 5/2009 | Karabinis | H04B 7/18563 455/427 |
| 2016/0183126 A1* | 6/2016 | Roy | H04W 28/085 370/322 |

\* cited by examiner

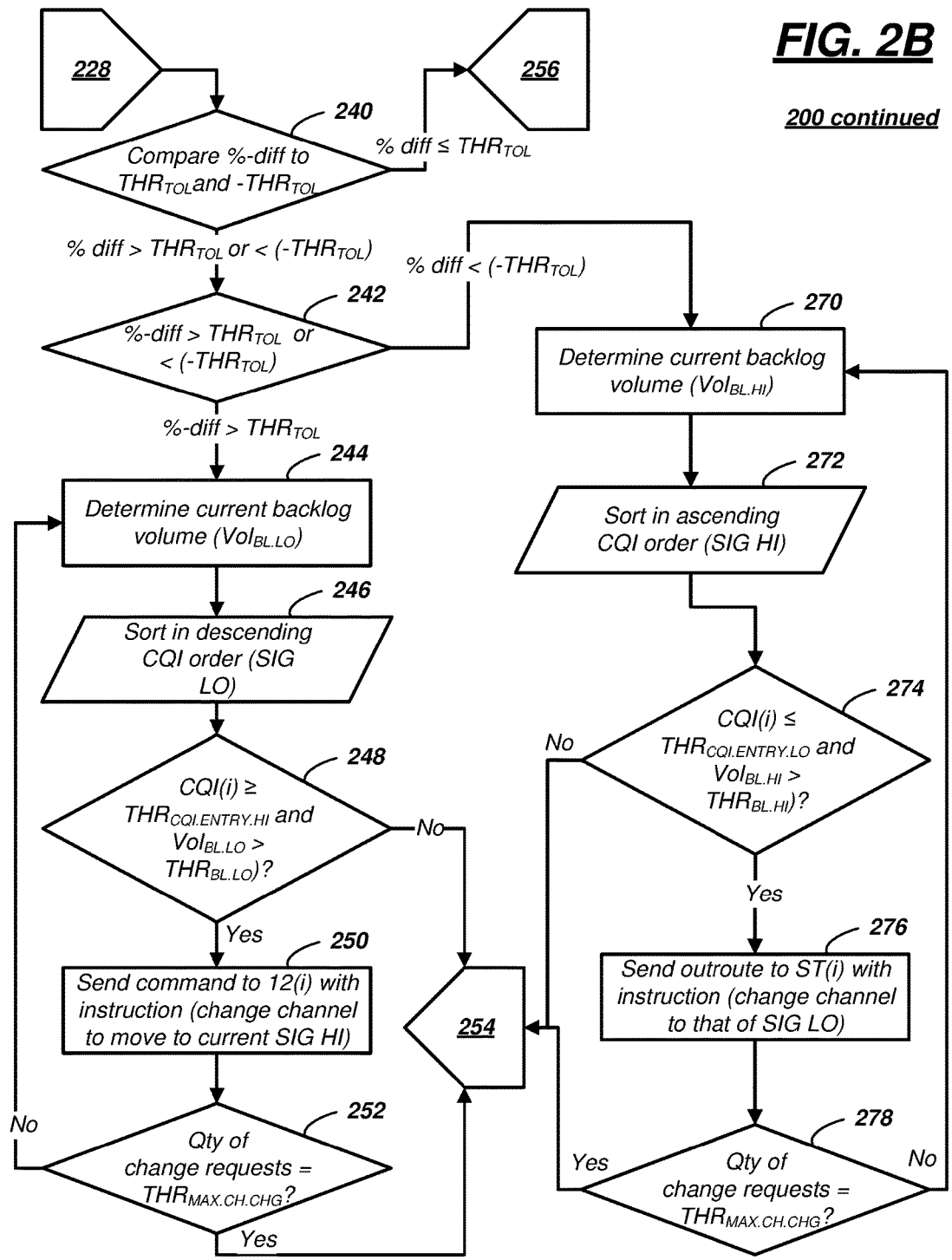

200 continued

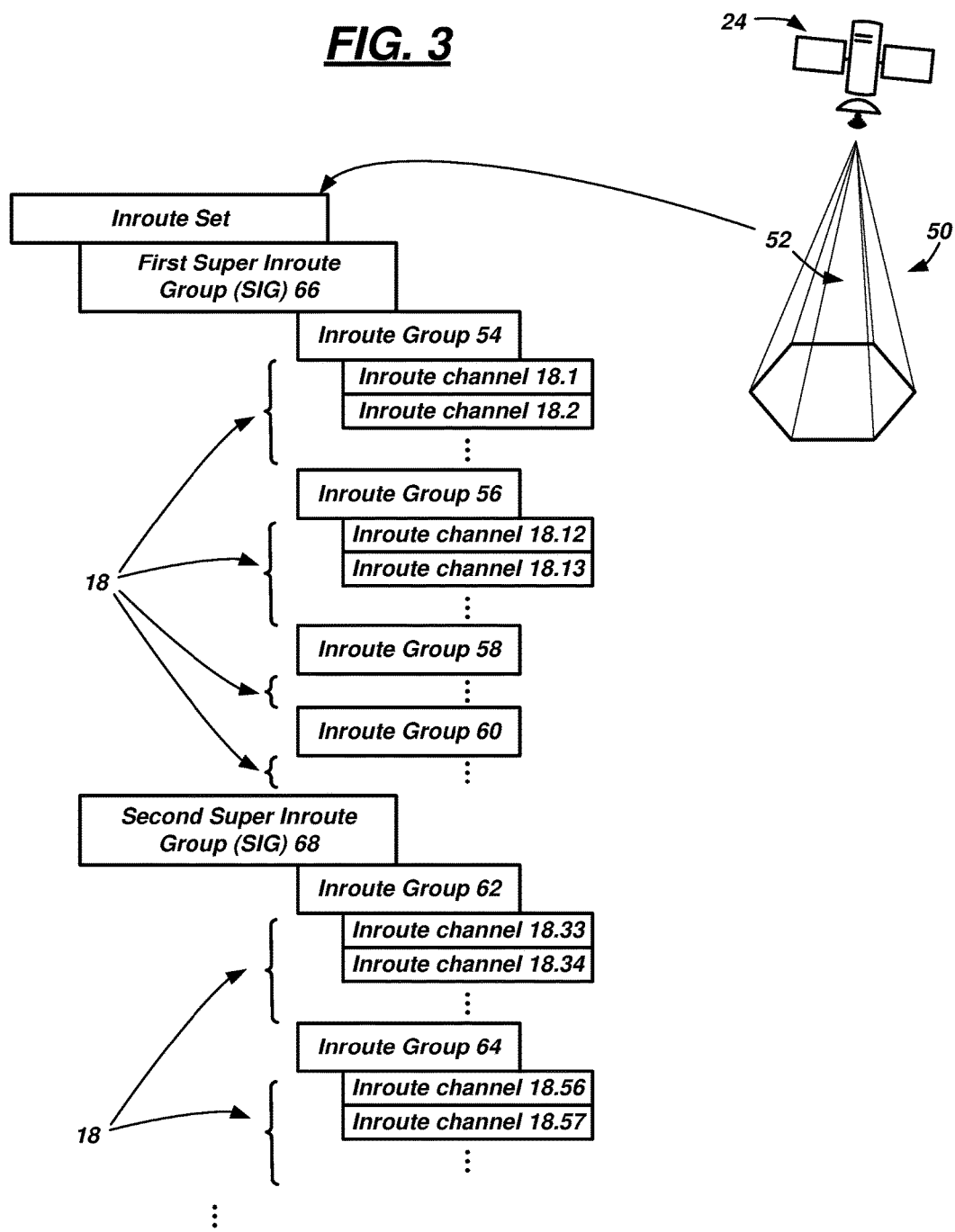

BALANCING WIRELESS TERMINAL TRAFFIC

BACKGROUND

In telecommunications, a terminal device may control the communication channel by which it sends and/or receives data. For example, the device can be programmed to determine the quality of a received signal and compare this quality to a predetermined threshold. When the terminal determines that the signal quality is greater than the threshold, the terminal may be programmed to select a different channel—e.g., changing from a channel associated with a slower transmission rate to a channel associated with a higher transmission rate.

BRIEF DESCRIPTION OF THE DRAWINGS

FIGS. 2A-2C illustrate a flow diagram of a process of balancing communication traffic between a gateway computer and a plurality of terminals.

FIG. 3 is a schematic diagram illustrating an example of how inroute channels can be aggregated by the computer.

DETAILED DESCRIPTION

Figure 1:
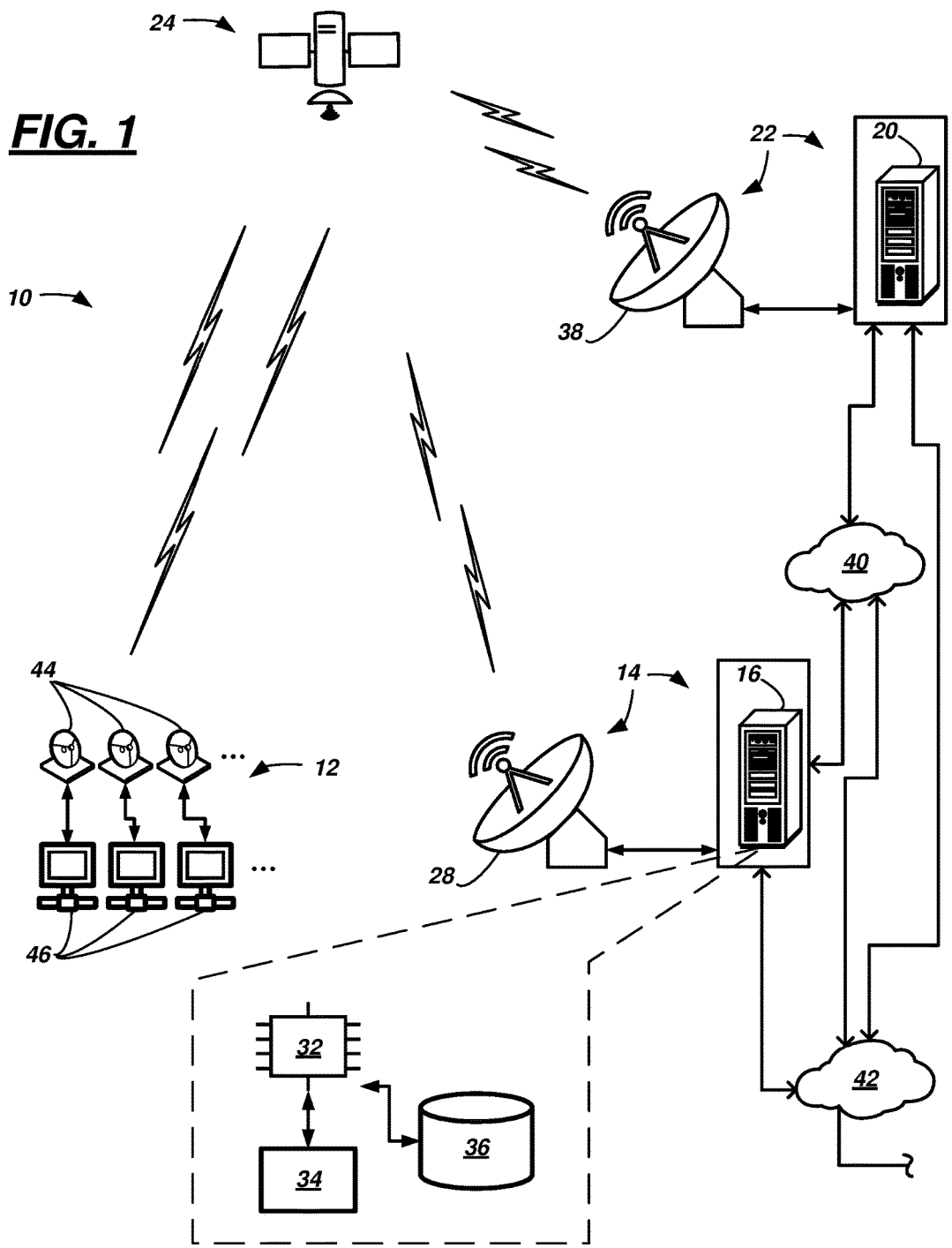
FIG. 1 is a schematic diagram illustrating an exemplary telecommunication system.

According to an illustrative example, a telecommunication system is described that includes a gateway computer. The computer may have a processor and memory storing instructions executable by the processor, and the instructions may include: for each of a plurality of terminals, to receive inroute data via one of a plurality of respective inroute channels; using the plurality of respective inroute channels, to determine a first super inroute group (SIG) of inroute channels and a second super inroute group (SIG) of inroute channels, wherein the determination of first and second SIGs is based on symbol rates of the respective inroute channels; to determine a channel quality value of a first inroute channel, of a first terminal, wherein the first inroute channel is one of the plurality of respective inroute channels, wherein the first terminal is one of the plurality of terminals; to determine a backlog volume of one of the first SIG or the second SIG; and based on determining the channel quality value of the first terminal and the backlog volume of the first or second SIGs, to transmit, to the first terminal, outroute data comprising an instruction to change to a different inroute channel of the first or second SIG.

According to the at least one example set forth above, the system further comprises a satellite gateway that comprises the computer, wherein the gateway is coupled to a public or private communication network.

According to the at least one example set forth above, the plurality of terminals are satellite terminals.

According to the at least one example set forth above, the value is based at least partially on an actual transmission power used by the first terminal to communicate via the first inroute channel.

According to the at least one example set forth above, the value further includes a potential transmission power that could have been used by the first terminal to communicate via the first inroute channel According to the at least one example set forth above, the value is at least partially based on interference and noise of the first inroute channel.

According to the at least one example set forth above, the instructions further include: to determine a second channel quality value of a second inroute channel, of a second terminal, wherein the second terminal is one of the plurality of terminals; to re-determine the backlog volume of the first or second SIG; and based on determining the second channel quality value and based on the re-determined backlog volume, to determine to transmit, to the second terminal, outroute data comprising an instruction to change to a different inroute channel of the first or second SIG.

According to the at least one example set forth above, each of the plurality of respective inroute channels have multiple access of TDMA, FDMA, CDMA or SCMA and different symbol rates, such as one of the following symbol rates: 512 kilo-symbols-per-second, 1024 kilo-symbols-per-second, 2048 kilo-symbols-per-second, 4096 kilo-symbols-per-second, 6144 kilo-symbols-per-second, 8192 kilo-symbols-per-second, or 12288 kilo-symbols-per-second, wherein the first SIG is associated with one of these symbol rates, wherein the second SIG is associated with a different one of these symbol rates.

According to the at least one example set forth above, the instructions further include: to transmit the instruction to change from the first SIG to an inroute channel of the second SIG based on determining that the channel quality value of the first terminal is higher than a threshold, wherein the second SIG comprises a faster symbol rate than the first SIG.

According to the at least one example set forth above, the instructions further include: to determine a third SIG and a fourth SIG using the plurality of respective inroute channels; and using the channel quality value and backlog volume, to transmit the instruction to change to one of the third or fourth SIGs, wherein a symbol rate of the third SIG is faster than the symbol rate of the second SIG, wherein a symbol rate of the fourth SIG is faster than the symbol rate of the third SIG.

According to the at least one example set forth above, the instructions further include: t to determine a channel quality value for each of the plurality of terminals; based on the respective channel quality values, to sort the plurality of terminals of the first SIG or the second SIG according to a descending order; and after transmitting the outroute data, then: to re-determine the respective backlog volume; and based on the sorting and the re-determining, to transmit second outroute data to a second terminal, wherein the second terminal is one of the plurality of terminals and is second in the descending order, wherein the second outroute data comprises an instruction to change to a different inroute channel.

According to the at least one example set forth above, the instructions further include: to determine a channel quality value for each of the plurality of terminals; based on the respective channel quality values, to sort the plurality of terminals of the first SIG or the second SIG according to an ascending order; and after transmitting the outroute data, then: to re-determine the respective backlog volume; and based on the sorting and the re-determining, to transmit second outroute data to a second terminal, wherein the second terminal is one of the plurality of terminals and is second in the ascending order, wherein the second outroute data comprises an instruction to change to a different inroute channel.

According to the at least one example set forth above, the instructions further include: to determine a tolerance threshold using a target backlog density and an actual backlog density; and to balance the plurality of terminals between the first and second SIGs based on the threshold.

According to the at least one example set forth above, the target backlog density is based on a weighting of the first and second SIGs.

According to the at least one example set forth above, the instructions further may include: to determine a third SIG and a fourth SIG using the plurality of respective inroute channels, wherein the target backlog density is based on a weighting of at least the first, second, third, and fourth SIGs.

According to another illustrative example, a method includes: for each of a plurality of terminals, receiving inroute data via one of a plurality of respective inroute channels using the plurality of respective inroute channels, determining a first super inroute group (SIG) of inroute channels and a second super inroute group (SIG) of inroute channels, wherein the determination of first and second SIGs is based on symbol rates of the respective inroute channels; determining a channel quality value of a first inroute channel, of a first terminal, wherein the first inroute channel is one of the plurality of respective inroute channels, wherein the first terminal is one of the plurality of terminals; determining a backlog volume of one of the first SIG or the second SIG; and based on determining the channel quality value of the first terminal and the backlog volume of the first or second SIGs, transmitting, to the first terminal, outroute data comprising an instruction to change to a different inroute channel of the first or second SIG According to the at least one example set forth above, the method further includes transmitting the instruction to change from the first SIG to an inroute channel of the second SIG based on determining that the channel quality value of the first terminal is higher than a threshold, wherein the second SIG comprises a faster symbol rate than the first SIG.

According to the at least one example set forth above, the method further includes: determining a second channel quality value of a second inroute channel, of a second terminal, wherein the second terminal is one of the plurality of terminals; re-determining the backlog volume of the first or second SIG; and based on determining the second channel quality value and based on re-determining the backlog volume, determining to transmit, to the second terminal, outroute data comprising an instruction to change to a different inroute channel of the first or second SIG.

According to the at least one example set forth above, the method further includes: performing at least one of a first set of instructions or a second set of instructions, wherein the first set of instructions comprise: determining a channel quality value for each of the plurality of terminals; based on the respective channel quality values, sorting the plurality of terminals of the first SIG or the second SIG according to a descending order; and after transmitting the outroute data, then: re-determining the respective backlog volume; and based on the sorting and the re-determining, transmitting second outroute data to a second terminal, wherein the second terminal is one of the plurality of terminals and is second in the descending order, wherein the second outroute data comprises an instruction to change to a different inroute channel, and wherein the second set of instructions comprise: determining a channel quality value for each of the plurality of terminals; based on the respective channel quality values, sorting the plurality of terminals of the first SIG or the second SIG according to an ascending order; and after transmitting the first outroute data, then: re-determining the respective backlog volume; and based on the sorting and the re-determining, transmitting second outroute data to a second terminal, wherein the second terminal is one of the plurality of terminals and is second in the ascending order, wherein the second outroute data comprises an instruction to change to a different inroute channel.

According to another illustrative example, a telecommunication system is described that includes a gateway computer. The computer may have a processor and memory storing instructions executable by the processor, and the instructions may include: to receive inroute data via an inroute channel of a first terminal; to determine a first super inroute group (SIG) of inroute channels and a second super inroute group (SIG) of inroute channels, wherein the determination of first and second SIGs is based on symbol rates of a plurality of inroute channels, wherein the plurality of inroute channels includes the inroute channel of the first terminal; to determine, for the first terminal, at least one of: a user group priority, a user group subscription rate, a user group quality of service (QoS) value, a channel quality parameter, or a backlog parameter; and based on determining at least one of: the respective user group priority, the respective user group subscription rate, the respective user group quality of service (QoS) value, the respective channel quality parameter, or the respective backlog parameter, to transmit, to the first terminal, outroute data comprising an instruction to change to a different inroute channel of the first or second SIG.

Any of the method examples set forth above may be combined with one another according to any suitable combination.

According to at least one example, a computer is disclosed that is programmed to execute any combination of the method examples set forth above.

According to at least one example, a computer program product is disclosed that includes a computer readable medium storing instructions executable by a computer processor, wherein the instructions include any combination of the instruction examples set forth above.

According to the at least one example, a computer program product is disclosed that includes a computer readable medium that stores instructions executable by a computer processor, wherein the instructions include any combination of the method examples set forth above.

With reference to the figures wherein like reference numerals denote identical or like features or elements, a telecommunication system 10 is shown in FIG. 1 for improving the transmission efficiency of wireless traffic received from a plurality of wireless terminals 12. In general, the telecommunication system 10 includes a gateway 14 having a computer 16 that is programmed to receive inroute data from terminals 12 via inroute channels 18 (schematically illustrated in FIG. 3) (which channels 18 were selected by the respective terminals 12), and then determine whether to instruct at least some of the terminals 12 to change to a different inroute channel—e.g., to a channel associated with a faster symbol rate or to a channel associated with a slower symbol rate. Conventionally, the terminal 12 exclusively makes this determination; however, in the present disclosure, the computer 16 may influence channel selection. As described more below, as any given terminal 12 may be unaware of the channels selected by the other terminals 12, the gateway computer 16 may be in a better position to determine whether some channels are heavily trafficked and whether other channels are being under-utilized. For example, based on conditions determined by the terminals 12, a number of terminals may be selecting and heavily trafficking a particular symbol rate—e.g., each anticipating that by selecting this particular (higher) symbol rate, the respective terminal 12 may be able to communicate faster (e.g., thereby processing its inroute data and/or backlog volume more rapidly). However, if too many terminals 12 concurrently re-select and begin communicating via this particular higher symbol rate, the available throughput (e.g., across an associated satellite beam) may be consumed resulting in greater individual terminal backlog and an actual overall decrease in throughput. Thus, instead of overall terminal backlog decreasing based on the terminal reselections, backlog increases resulting in, among other things, frustration by terminal users. Herein, a process executable by the gateway computer 16 is described to minimize terminal backlog and balance a traffic load over a set of channels 18 handled by the gateway computer 16.

In the description that follows, the telecommunications system 10 is described in detail as a satellite system and the terminals 12 are described as satellite terminals (STs); however, this is merely one example to illustrate how a computer (e.g., such as computer 16) which communicatively couples the terminals 12 to a private, public, or other suitable network may be operated. Cellular (e.g., LTE, CDMA, GSM, etc.), short range wireless (e.g., Wi-Fi, Bluetooth, etc.), and other types of telecommunication systems also can be used instead. And for example, the terminals 12 could be stationary and/or portable electronic computing devices comprising one or more of a satellite chipset, a cellular chipset, a short-range wireless chipset, or the like.

Thus, according to the illustrated example, the telecommunication system 10 may be a so-called bent-pipe satellite system that includes: one or more computers (e.g., such as computer 16) located at each of a plurality of satellite gateways 14 (one gateway is shown for illustrative purposes), one or more similar computers 20 located at a network operations center (NOC) 22, one or more satellites 24 (again, one shown for illustrative purposes), and a plurality of satellite terminals 12 (three are shown for illustrative purposes; however, in practice, thousands or more may be associated with a single satellite gateway 14). A bent-pipe system is one in which the satellite 24 receives a wireless uplink communication from one of the terminals 12 via one of a plurality of channels, amplifies the communication, performs a frequency shift (to convert the uplink communication to a downlink communication), amplifies the downlink communication, and transmits the downlink communication to the computer 16. Thus, in bent-pipe systems, the satellite 24 may not be programmed to demodulate and/or decode the communication as part of the frequency shift; however, systems other than bent-pipe systems also can be used instead. This is merely one example.

In at least some examples, each of the satellite gateways 14 may be identical; therefore, only one will be described. Gateway 14 may perform a variety of functions, including but not limited to: link layer and physical layer outroute coding and modulation, link layer and physical layer inroute handling, inroute bandwidth allocation and load balancing functions, outroute prioritization, web acceleration and HTTP compression, flow control, encryption, redundancy switchovers, traffic restriction policy enforcement, and the like. In at least some examples, the gateway 14 may select suitable symbol rates for terminals 12 in communication therewith (while the respective terminals 12 each may select a suitable (and possibly different) code rate)—thereby optimizing bit efficiency of the network.

Among other things, gateway 14 may include an antenna 28 (e.g., for satellite reception and/or transmission) coupled to at least one computer 16, each such computer comprising one or more processors 32, memory 34, and/or one or more databases 36. Where gateway 14 comprises more than one computer 16, these computers may have similar or identical components, features, and/or characteristics; therefore, only one will be described. Further, in multiple-computer arrangements, one computer may function as a task-manager of slave computers; while the slave computers may carry out one or more dedicated functions, operations, etc. Of course, this also is merely an example, and still other examples exist. For instance, in some gateway examples, at least some of the computers 16 may execute a similar or identical set of programming instructions, including at least some of the instructions exemplified in the blocks of FIGS. 2A-2C (which are described below).

One processor 32 is shown for illustrative purposes only; however, multiple processors 32 could form a portion of computer 16. Processor 32 can be any type of device capable of processing electronic instructions, non-limiting examples including a microprocessor, a microcontroller or controller, an application specific integrated circuit (ASIC), etc.—just to name a few. In general, computer 16 may be programmed to execute digitally-stored instructions, which may be stored in memory 34, which enable the processor 32, among other things, to: receive data via a plurality of inroute channels; identify and group terminals according to their respective channels (e.g., based on the symbol rates of the respective channels); determine to attempt to move a terminal 12 from a first channel to a second channel in order to balance inroute channel traffic, wherein the first and second channels are associated with different symbol rates; and transmit a command via an outroute channel to the respective terminal based on the determination. This is merely one exemplary set of instructions; other sets of instructions exist which may or may not be executed with this example.

Memory 34 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 34 may store one or more computer program products which may be embodied as software, firmware, or the like.

Database 36 may be any suitable data repositories or other data stores that can include various kinds of mechanisms for storing, accessing, and retrieving various kinds of data, including a hierarchical database, a set of files in a file system, an application database in a proprietary format, a relational database management system (RDBMS), etc. Each such data store can be included within a computer (such as computer 16) employing a computer operating system such as one of those computers mentioned above, and may be accessible via a network in any one or more of a variety of manners. A file system also may be accessible from a computer operating system, and may include files stored in various formats. An RDBMS generally employs the Structured Query Language (SQL) in addition to a language for creating, storing, editing, and executing stored procedures, such as the PL/SQL language mentioned above. These are merely examples; other database examples also can exist.

Network operations center (NOC) 22 may be similar to the satellite gateway 14—e.g., the NOC 22 may comprise an antenna 38 and computer 20 that may be assembled, arranged, connected, etc. identical to computer 16 of gateway 14. Thus, computer 20 may be programmed to carry out the same instructions with which computer 16 is programmed. However, in at least one example, NOC computer 20 carries out additional instructions as well. For example, computer 20 may comprise management instructions—e.g., executing network management, facilitating software downloads to the satellite terminals, monitoring satellite terminal statuses, executing statistical functions (e.g., associated with satellite terminal data collection, aggregation, reporting, etc.), executing security functions (e.g., including but not limited to key generation, key management and distribution to suitable satellite terminals, etc.), satellite terminal registration and/or authentication, just to name a few examples. Furthermore, the NOC 22 may be located at a separate geographical site than one or more of the gateways 14; or in another example, NOC 22 may be co-located with at least one of the gateways 14. Accordingly, computer functions described herein may be carried out by the NOC 22 and/or one or more of the gateways 14.

FIG. 1 also illustrates that the satellite gateways 14 and the NOC 22 may be coupled to one another via a private communication network 40 and/or a conventional public communication network 42. In at least one example, the physical architecture of each of the networks 40, 42 may be similar or identical; however, the function and use of the networks 40, 42 may differ in one or more regards. For example, each of networks 40, 42 may comprise land communication network elements (not shown) which can enable connectivity to public switched telephone network (PSTN) such as that used to provide hardwired telephony, packet-switched data communications, internet infrastructure, and the like, and/or wireless communication network elements (not shown) which may facilitate cellular telephone communication (e.g., using LTE, CDMA, GSM, etc.) over wide geographic region(s). The private communication network 40 may function as an intra-net—e.g., facilitating communication only between a plurality of gateways 14 and/or NOC 22, whereas, the public communication network 42 may facilitate communication between the telecommunication system 10 (e.g., the terminals 12, gateways 14, NOC 22, etc.) and other electronic computing devices (e.g., via the internet). Thus, secure communications via the private network 40 may be facilitated using both a physical layer, as well as via encryption and other such suitable techniques. Accordingly, FIG. 1 shows the gateway 14 coupled to the private communication network 40 and the public communication network 42, the NOC 22 coupled to the private communication network 40 and the public communication network 42, the private communication network 40 coupled to the public communication network 42, and the public communication network 42 couplable to other systems, components, computing devices, etc.

Satellite terminals 12 may be any suitable end-user equipment capable of satellite communication—e.g., terminals 12 may include an antenna 44 and a respective computing device 46, as will be appreciated by skilled artisans. For example, while not illustrated, the terminals 12 each may have a communication circuit or satellite chipset enabling wireless communication with satellite 24. Non-limiting examples of satellite terminals 12 include a global positioning system (GPS) device, a satellite telephone, a stationary computer, a mobile satellite transceiver (e.g., for a land, marine, or aircraft vehicle), and the like.

Satellite 24 may be any suitable satellite communication equipment located in earth's orbit—non-limiting examples include: communications satellites, observation satellites, navigation satellites, weather satellites, space telescopes, etc. Non-limiting examples of earth orbits include: geocentric orbits, heliocentric orbits, areocentric orbits, low earth orbits (LEO), medium earth orbits (MEO), geosynchronous orbits (GEO), high earth orbits (HEO), etc. Other orbits or orbit classifications also exist and are known to skilled artisans. Terminals 12 may provide inroute data to satellite 24 via an uplink communication (e.g., over an inroute channel), and in turn, satellite 24 may relay the inroute data to gateway 14 via the same inroute channel. Similarly, gateway 14 may provide outroute data (e.g., a command) to satellite 24 via an uplink communication, and in turn, satellite 24 may relay the outroute data to one or more terminals 12 via a downlink communication. As used herein, inroute data is data sent from a terminal 12 to computer 16 of gateway 14 (and/or computer 20 of NOC 22) via wireless communication using an inroute channel. As used herein, outroute data is data sent from computer 16 (or from computer 20) to a terminal 12 via wireless communication using an outroute channel. As used herein, a channel is a wireless communication link having a predetermined maximum symbol rate (e.g., such as 512 kilo-symbols per second or ksps, 1024 ksps, 2048 ksps, 4096 ksps, 6144 ksps, 8192 ksps, 12,288 ksps, just to name a few non-limiting examples). Further, each respective channel may be defined by a modulation and coding scheme (e.g., Phase Shift Keying (PSK), 8-PSK, Quaternary PSK or QPSK, Asymmetric PSK or APSK, Quadrature Amplitude Modulation (QAM), 8-QAM, 16-QAM, 32-QAM, just to name a few non-limiting examples) and/or a transmission type (e.g., Time Division Multiple Access (TDMA), Frequency Division Multiple Access, Code Division Multiple Access (CDMA), Scramble Coded Multiple Access (SCMA), just to name a few non-limiting examples). Thus, as used herein, an inroute channel carries inroute data from a terminal 12 to computer 16 (or 20), and as used herein, an outroute channel carries outroute data from the computer 16 (or 20) to the terminal(s) 12.

As described above, in one example, inroute channels and outroute channels are associated with satellite communications. Further, computer 16 (or 20) may organize, sort, aggregate, etc. these channels in order to promote traffic load balancing, as described more below. FIG. 3 illustrates a satellite beam 50 from satellite 24. A plurality of inroute channels 18 (e.g., 18.1, 18.2, 18.12, 18.13, 18.33, 18.34, 18.56, 18.57, just to name a few) within the beam 50 can be characterized as an inroute set 52. Computer 16 (or 20) may determine from the inroute set 52 a number of inroute portions or groups of inroute channels—shown as inroute groups 54, 56, 58, 60, 62, 64 (of course, more or fewer inroute groups are also possible). Each inroute group 54-64 may include one or more inroute channels—e.g., for illustration purposes only, group 54 includes inroute channels 18.1 and 18.2, group 56 includes inroute channels 18.12 and 18.13, inroute group 62 includes inroute channels 18.33 and 18.34, inroute group 64 includes inroute channels 18.56 and 18.57, and inroute groups 58 and 60 each include or more inroute channels as well (although not shown in FIG. 3). The inroute channels of a respective inroute group (e.g., at least one of inroute group 54, 56, 58, 60, 62, or 64) can be characterized as having a common symbol rate (or maximum symbol rate) and a common modulation and coding scheme. Thus, while some inroute groups may have the same symbol rate, they may utilize different modulation and coding schemes (and/or different transmission types).

To illustrate, consider inroute groups 54-60, wherein e.g.: channels 18.1, 18.2, etc. of inroute group 54 each may have a symbol rate of 2048 ksps while using a QPSK modulation and coding scheme, channels 18.12, 18.13, etc. of inroute group 56 each may have a symbol rate of 2048 ksps while using a 16-APSK modulation and coding scheme, channels of inroute group 58 each may have a symbol rate of 2048 ksps while using an SCMA transmission type, and channels of inroute group 60 each may have a symbol rate of 2048 ksps while using an TDMA transmission type. These of course are merely examples—groups 54-60 may use other modulation and coding schemes and/or other transmission types instead (or in combination with those described above). Based on a common symbol rate, inroute groups 54-60 may be characterized as a group or a super inroute group (SIG) 66. Thus, all channels of SIG 66 may have a common maximum symbol rate, but the respective inroute inroutes (54-62—and corresponding channels) may have a different modulation and coding scheme, a different transmission type, or combination thereof. As used herein, a super inroute group is one or more inroute groups that each comprise one or more different inroute channels (received within a common beam 52), wherein each inroute channel within the super inroute group has the same maximum symbol rate.

Further continuing with the example above, consider inroute groups 62, 64, e.g.: computer 16 (or 20) may determine that channels 18.33, 18.34, etc. of inroute group 62 each may have a symbol rate of 4096 ksps while using a QPSK modulation and coding scheme and channels 18.56, 18.57, etc. of inroute group 64 each may have a symbol rate of 4096 ksps while using a 16-APSK modulation and coding scheme. As each of the inroute groups 62, 64 (and corresponding channels) have a common maximum symbol rate, these too may be characterized as a different super inroute group (e.g., SIG 68). Further, inroute set 52 may have any suitable quantity of SIGs, each respective SIG may have any suitable quantity of inroute groups, and each respective inroute group may have any suitable quantity of inroute channels.

As described above the channels 18 may be characterized by computer 16 (or 20) according to symbol rate—e.g., or more particularly, a maximum symbol rate. The symbol rates used by each respective terminal 12 are less than or equal to its maximum symbol rate—however, the slowest symbol rate used by any particular terminal 12 may not overlap with a maximum symbol rate of a neighboring SIG (e.g., continuing with the example above, the slowest symbol rate used by a terminal 12 in SIG 68 may not be less than or equal to a symbol rate used in SIG 66). Non-limiting examples of maximum symbol rates include: a first symbol rate of 512 kilo-symbols-per-second (ksps) (e.g., shown in FIG. 4 and referred to as 512 k), a second symbol rate of 1024 ksps (e.g., shown and referred to as 1 M); a third symbol rate of 2048 ksps (e.g., shown and referred to as 2 M); and a fourth symbol rate of 4096 ksps (e.g., shown and referred to as 4 M). These are merely symbol rate examples; other non-limiting examples of symbol rates include 6144 ksps (6 M), 8192 ksps (8 M), 12,288 ksps (12M), as well as even higher symbol rates.

By computers 16, 20 aggregating the inroute channels into SIGs (e.g., such as SIGs 66, 68), computers 16, 20 may determine which terminals should be moved to improve terminal backlog and throughput efficiency. Since a terminal carries backlog, moving a terminal from one SIG to another improves load management among SIGs so that SIGs approach predefined and respective load targets. In the traffic or load balancing discussion that follows, computers 16, 20 may instruct the terminals 12 to move between four illustrative SIGs associated with a 512 k rate, a 1 M rate, a 2 M rate, and a 4 M rate as an example shown. (Of course, there can be more SIGs with more symbol rates for terminals to be instructed to move between.) As the instructions carried out by computer 16 may be identical to the instructions carried out by computer 20, only one will be described.

Figure 2A:
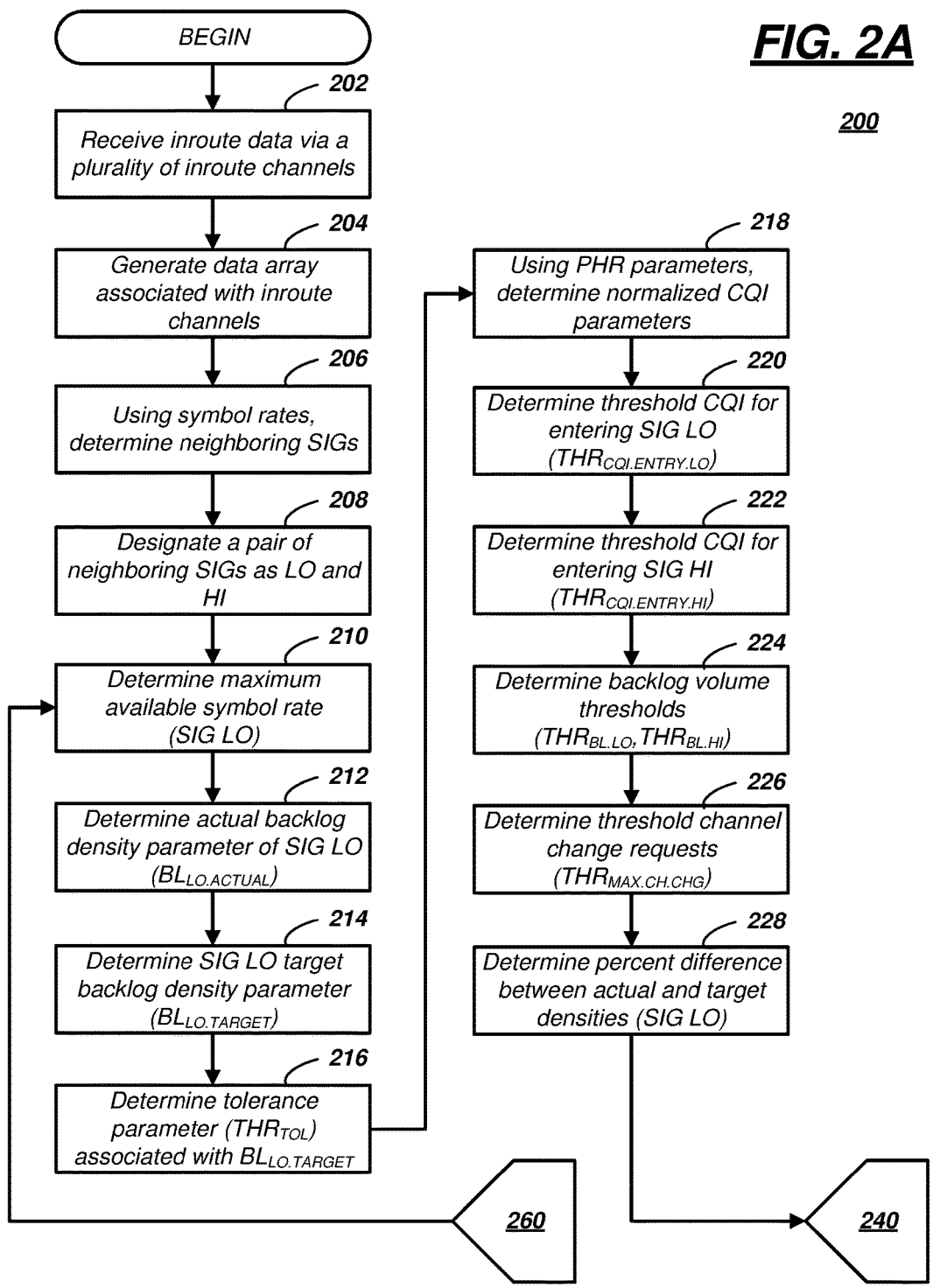
Figure 2C:
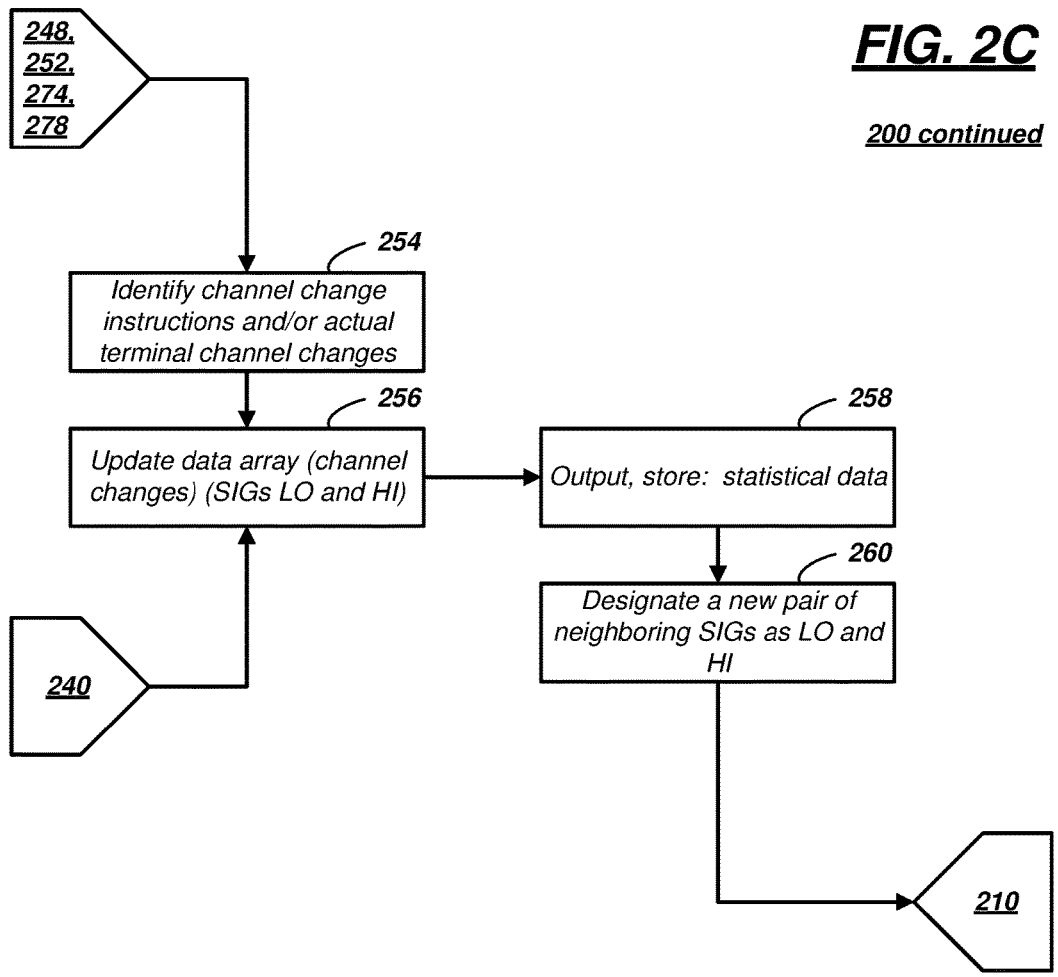

Turning now to FIGS. 2A-2C, a process 200 is shown for balancing inroute traffic among SIGs. The process may comprise a set of instructions stored (at least in part) in memory 34 executable by computer 16 (e.g., more specifically, processor(s) 32). While executing the instructions, computer 16 may utilize one or more data sets, data structures, files, instruction routines (and/or subroutines), etc. stored in database 36. To illustrate, while executing process 200, computer 16 may determine that one or more of SIGs 512 k, 1 M, 2 M, 4 M is being over-utilized (and/or that at least one of the other of SIGs 512 k, 1 M, 2 M, 4 M is being under-utilized). Consequently, computer 16 may instruct one or more terminals 12 to move to a channel that has a different symbol rate—e.g., and this may effectively cause the terminal(s) to move to a different SIG.

Process 200 may begin with block 202 wherein computer 16 receives via antenna 28 inroute data via a plurality of inroute channels (e.g., from multiple terminals 12 within beam 50). As discussed above, inroute channels may be formed using Time Division Multiple Access (TDMA), Frequency Division Multiple Access (FDMA), Code Division Multiple Access (CDMA), Scramble Coded Multiple Access (SCMA), or the like. And reception of any inroute data may include executing decompression techniques, decoding techniques, decryption techniques, and a number of other techniques known in the art.

In block 204 which follows, computer 16 may generate a data array associated with the inroute data received via the inroute channels (of block 202). And the data array may be stored in memory 34 and/or database 36. The array may include one or more data types. Non-limiting examples of data types include: an identifier (e.g., of the terminal), a target symbol rate selected by the terminal 12 (e.g., such as 512 ksps, 1024 ksps, 2048 ksps, 4096 ksps, 6144 ksps, 8192 ksps, 12,288 ksps, etc.), an actual symbol rate at which the terminal transmitted which may be less than the target symbol rate and which may be based on transmission conditions—(e.g., as used herein, transmission conditions include one or more of: conditions at the respective terminals 12, conditions at the respective satellite 24, uplink communication and/or downlink communication conditions, or the like), a modulation and coding scheme parameter (a SYMCOD parameter), a backlog parameter (e.g., identifying a measure of backlog volume associated with the sending terminal 12), a power headroom (PHR) parameter, a channel quality parameter (e.g., determined by computer 16 based on quantifiable data provided by the respective terminal(s) 12), and/or the like (these and other data types will be discussed below). Any suitable combination of these data types may be provided by the terminal(s) 12. Further, the array may be parse-able by computer 16—e.g., filtering and/or searching by identifier, by channel quality parameter, or by one or more of the other parameters.

In some instances, some parameters of the array may be determined by computer 16 periodically (e.g., during an Aloha burst). For example, for a so-called stream channel, power parameters may be reported to computer 16 intermittently (e.g., as needed)—e.g., when a power headroom changes by 0.10 dB, by 0.30 dB, or the like.

In block 206, based on the inroute data and/or the generated data array, computer 16 may determine, aggregate and/or otherwise categorize the terminals into one or more inroute groups (e.g., 54-64) and into one or more SIGs (512 k, 1 M, 2 M, 4 M) according to their respective symbol rates and/or other parameters (e.g., such as SYMCOD parameters). For example, as described above, multiple inroute groups having the same first or target symbol rate may be form one SIG, other inroute groups having a different target symbol rate may form another SIG, etc. As used herein, neighboring SIGs include those whose maximum symbol rate is closest to one another. Exemplary neighboring pairs of symbol rates include 512 k and 1 M, 1 M and 2 M, and 2 M and 4 M. Of course, where other symbol rates are used, the neighboring SIG pairs may differ.

Figure 4:
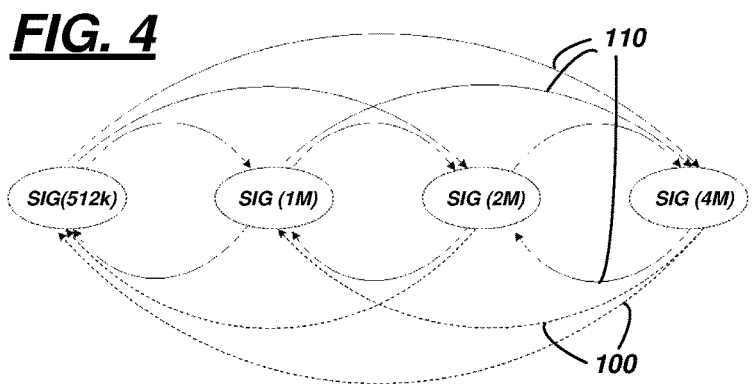
FIG. 4 is a diagram illustrating gateway computer load balancing between super inroute groups aggregated by symbol rate.

In block 208, computer 16 may determine a hierarchy of SIGs based on the respective target symbol rates—e.g., the hierarchy being sorted lowest to highest. And within the respective SIGs, the computer 16 may determine inroute groups based on the respective modulation and coding parameters of the respective inroute channels. One such example is shown in FIG. 4—e.g., 512k (being the lowest or slowest target symbol rate), then 1 M (e.g., 1024k), then 2 M (e.g., 2048k), and then 4 M (e.g., 4096k) (being the highest or fastest target symbol rate of the SIGs). In block 208, for purposes of initiating the traffic balancing of inroute set 52, computer 16 also may designate a pair of the neighboring SIGs as LO and HI. Later in process 200, the SIGs designated LO and HI will change. In at least one example, computer 16 designates 512k as SIG LO and 1 M as SIG HI—e.g., beginning at the slowest end of the hierarchy. Later, for example, SIGs 1 M and 2 M may be labeled or assigned as LO and HI (respectively) and eventually, SIGs 2 M and 4 M (respectively) may be so designated as well.

In block 210, computer 16 may determine a maximum available symbol rate of SIG LO. Continuing with the present example, the maximum available symbol rate of SIG LO may be determined to be 512 ksps—e.g., by looking up a value stored in the data array (e.g., in memory 34 or the like).

Block 212 may follow. Here, computer 16 may determine an actual backlog density parameter of the inroute channels associated with SIG LO ($BL_{LO,ACTUAL}$). According to one example, computer 16 may identify the terminals 12 associated with SIG LO (e.g., using their identifiers), determine an effective backlog (A) (in bytes), and divide the effective backlog by an average symbol rate (S) (in ksps) associated with the identifiers; i.e., for the particular SIG LO, backlog BL=A/S. According to one example, average symbol rate excludes constant bit rates (e.g., for voice over internet protocol (VOIP)) and/or Aloha. See Equations (1) and (2) below. This summarizes the execution of block 212 for the inroute groups of an entire SIG; however, it should be appreciated that block 212 may be carried out piece-wise for each inroute group. For example (piece-wise), the effective backlogs of each of the respective inroute groups may be summed to arrive at backlog (A), and an average symbol rate for each of the respective inroute groups may be determined and summed to arrive at average symbol rate (S). Then, in the piece-wise example, the backlog summation A may be divided by summation S to determine actual backlog density parameter of SIG LO ($BL_{LO,ACTUAL}$).

By determining actual backlog density parameter in bytes, computer 16 also may determine inroute latency. For example, given QPSK, ⅘, one symbol may carry 2*0.8 (or 1.6 bits); consequently, a backlog density parameter of 0.2 bytes/symbol/second would likely have an average delay of 1 second. By determining latency for one or more inroute groups or a SIG, computer 16 further may compare backlog processing times (e.g., to other inroute groups and/or SIGs) and better determine whether to instruct other terminals 12 to move between SIGs, as discussed more below. Of course, this latency determination is merely an example, and other techniques may be employed.

$$A = \Sigma \text{backlog parameters } (SIG\ LO) + \text{PL} * \Sigma \text{PL } (SIG\ LO) \quad \text{Equation (1) Effective Backlog (A)}$$

wherein PL is a periodic load (in bytes) to account for inroutes which may consume bandwidth periodically (e.g., occasionally having zero backlog), wherein b is a '0' or a '1,' wherein the default value of b is '1'

$$S = \Sigma \text{symbol rates of inroutes } (SIG\ LO)/\text{number of inroutes} \quad \text{Equation (2) Average Symbol Rate (S)}$$

In block 214, computer 16 may determine a target backlog density parameter ($BL_{LO,TARGET}$). As will be apparent from the discussion below, computer 16 may attempt to move terminals 12 from SIG LO when the actual backlog density parameter sufficiently is higher than its corresponding target backlog density parameter; similarly, computer 16 may attempt to move terminals 12 into SIG LO when the actual backlog density parameter sufficiently is lower than its corresponding target backlog density parameter. According to one example, the target backlog density parameter for SIG (512 k) may be predetermined—e.g., stored in memory 34 prior to execution of process 200. Therefore, computer 16 may determine the target backlog density parameter by retrieving it from memory 34.

According to another example of block 214, the target backlog density parameter may be calculated during process 200 (e.g., any time following block 202). In at least some instances, calculating the target backlog density parameter may promote telecommunication system efficiency. Consider for example relatively slow-traffic periods—a constant target backlog density parameter could cause computer 16 to attempt to move too many terminals 12 to SIG LO, where the respective throughputs would be slower. Instead, a variable target backlog density parameter can enable computer 16 to have a larger target backlog density parameter (e.g., of SIG LO or any SIG) during high-traffic periods and to have a lower target backlog density parameter (e.g., of SIG LO or any SIG) during slow-traffic periods.

According to one example, each SIG (e.g., 512 k, 1 M, 2 M, 4 M) may have an associated weighting W1, W2, W3, W4, etc. In one example, each weighting may be the same; e.g., 1/(quantity of SIGs). Continuing with the present example of four SIGs, 1/(4 SIGS) would equal a weighting of 0.25, or W1=W2=W3=W4=25%. However, this is only an example—e.g., weights need not total 100% (or 1) (e.g., a summation of weights W1, W2, W3, and W4 could equal 70%, 80%, 90%, etc.). To utilize this weighting (W1), computer 16 may determine target backlog density parameter by determining an average effective backlog of all inroute channels 18 in the inroute set 52 ($A_{TOTAL}$) (e.g., in the beam 50), and similarly determining an average symbol rate of all inroute channels in the inroute set 52 ($S_{TOTAL}$);

then, multiplying the weighting. For example, target backlog density parameter ($BL_{LO.TARGET}$) may equal $W1 * A_{TOTAL}/S_{TOTAL}$. In other examples, the weighting may not be equal. For example, it may be desirable to weight more heavily SIGs associated with slower target symbol rates. Thus, as a non-limiting example, the weighting W1 (associated with SIG 512 k) may be 40%, whereas the weighting W2 (associated with SIG 1 M) may be 20%, whereas the weighting W3 (associated with SIG 2 M) may be 20%, and whereas the weighting W4 (associated with SIG 4 M) also may be 20%. Of course, this is merely one example; other unequal weighting examples also exist (and these weighting values need not total 100% either). Thus, it should be appreciated that the terms 'balance' or 'balancing,' as used herein (with respect to terminal traffic of an inroute set (or any portion thereof)), may mean equalizing the amount of traffic (e.g., between two or more SIGs) or it may be adjusting the traffic to a determined (or predetermined) volume or density (e.g., so that one SIG approaches a first volume or density, so that another SIG approaches a second volume or density (which is not necessarily the same as the first volume or density), etc.). Thus, the terms 'balance' or 'balancing' does not necessary mean equalizing (e.g., equalizing quantities between SIGs).

In block 216, computer 16 may determine a tolerance parameter ($THR_{TOL}$) associated with the target backlog density parameter of the currently-designated SIG LO ($BL_{LO.TARGET}$). The tolerance parameter may be used to determine whether the respective SIG LO is over-crowded. For example, as will be explained more below, if a variance between the actual backlog density parameter and the target backlog density parameter is greater than the tolerance parameter, then computer 16 may instruct at least one of the terminals 12 to move between SIGs (e.g., from 512 k to 1 M). Or for example, if the variance is less than the tolerance parameter, then computer 16 may instruct at least one terminal 12 to move between SIGs (e.g., from 1 M to 512 k). And in at least one example, if the variance equals the tolerance parameter, computer 16 may determine to not instruct movement of any terminals from the respective SIG. In one example, the tolerance parameter is a single numeric value; however, in other examples, the tolerance parameter is a range of continuous values. As the quantities of terminals 12 are constantly changing within the respective SIGs, using the tolerance parameter $THR_{TOL}$ may promote unnecessary movement of terminals 12 between SIGs. Block 216 may occur at any suitable time during process 200.

In block 218, for each terminal in SIG LO, computer 16 may determine a channel quality value or parameter based on one or more parameters provided by the respective terminals 12. Balancing terminal traffic between SIGs may not only be based on quantities of terminals 12 in each respective SIG (e.g., 512 k, 1 M, 2 M, 4 M). Instead, computer 16 may determine whether a signal quality associated with a respective terminal is suitably high enough to be moved. Consider for example a terminal 12 which computer 16 moves from SIG LO to SIG HI. If the terminal 12 will not have sufficient signal quality at the higher symbol rate, the terminal itself may be programmed to fall back to the slower symbol rate—e.g., effectively returning the terminal to SIG LO again. Thus, by computer 16 determining a channel quality parameter before instructing the terminal to change channels (e.g., to a channel having a faster symbol rate), computer 16 may predict that the terminal 12 will not automatically revert to the back to the previous channel. In addition, by determining channel quality parameters of multiple terminals 12, computer 16 can determine which terminals are most suitable for movement between SIGs LO and HI—e.g., moving terminals 12 with a relatively high signal quality from SIG LO to HI and, in other instances, moving terminals 12 with a relatively low signal quality from SIGs HI to LO. According to one example, the channel quality parameter is a normalized channel quality indicator ($CQI_{NORM}$), which is derived (at least partially) from data provided to computer 16 (in blocks 202, 204) and as determined by computer 16 using Equations (3)-(9.1), or the like.

$$Power_{TX.ACTUAL} = Power_{TX.MAX} - PHR, \quad \text{Equation (3) Power Headroom Parameter (in dB)}$$

wherein PHR is received from the respective terminal 12 and stored in memory 34 (block 204), wherein $Power_{TX.MAX}$ is a maximum output power that a respective terminal 12 can transmit, wherein $Power_{TX.ACTUAL}$ is an actual output power transmitted at the respective terminal 12.

Thus, as used herein, a power headroom parameter is a difference between the power at which a terminal potentially can transmit via an inroute channel and the power at which the terminal actually did transmit via the inroute channel. Based on the respective inroute channel, a channel gain (G) also can be determined by computer 16, and computer 16 may determine Equation (4) by adding the gain G to each side of Equation (3):

$$G + Power_{TX.ACTUAL} = G + Power_{TX.MAX} - PHR,$$

wherein "$G+Power_{TX.ACTUAL}$" is equivalent to an actual power received at computer 16 ($Power_{RX.ACTUAL}$) and wherein "$G+Power_{TX.MAX}$" is equivalent to an actual maximum power possibly received at computer 16 ($Power_{RX.MAX}$).

Equation (5) can be determined by replacing "$G+Power_{TX.ACTUAL}$" with $Power_{RX.ACTUAL}$ and replacing "$G+Power_{TX.MAX}$" with $Power_{RX.MAX}$:

$$Power_{RX.ACTUAL} = Power_{RX.MAX} - PHR,$$

wherein "$G+Power_{TX.ACTUAL}$" is equivalent to an actual power received at computer 16 ($Power_{RX.ACTUAL}$) and wherein "$G+Power_{TX.MAX}$" is equivalent to an actual maximum power possibly received at computer 16 ($Power_{RX.MAX}$).

$$\gamma = Power_{RX.MAX}/(N_0 + I_0), \quad \text{Equation (6):}$$

wherein $\gamma$ is an interference plus noise density, wherein $N_0$ is a noise parameter for the particular inroute, and wherein $I_0$ is an interference density parameter for the particular inroute channel.

The noise parameter may be associated with terminal 12 and/or computer 16 noise (e.g., hardware noise). And the interference (or interference compensation) parameter may be associated with environmental noise or background noise associated with transmitting the signal wirelessly from the terminal 12 to the computer 16. As will be appreciated by skilled artisans, the terminal 12 may be programmed to determine whether additional power is needed to maintain the link—and correspondingly transmit the inroute to the computer 16 using this extra power. This compensation parameter also may be reported by the terminal to computer 16 (e.g., $I_0$).

For any respective inroute, a channel quality indicator (CQI) (in dB) may be defined by Equation (7) below, which is derived by combining Equations (5) and (6) and considering $Power_{RX.ACTUAL} \approx E_0 * S$.

$$CQI = E_0/(N_0 + I_0) + 10 * \log_{10}(S) + PHR,$$

wherein $E_0$ is a received symbol energy for a particular inroute channel, wherein S is the symbol rate for the particular inroute channel.

It should be appreciated that sometimes $E_0/(N_0+I_0)$—or the received signal to interference plus noise ratio (a.k.a., SINR or SNR)—also may be denoted simply as $E_0/N_0$, wherein the value is obtained by computer 16 via at physical layer (e.g., from the measurement of either ALOHA or stream transmission).

When the respective terminal 12 uses an ALOHA burst, an instant PHR parameter may be reported to computer 16. And when the respective terminal uses a stream burst, an averaged PHR parameter may be reported (e.g., averaged over a time interval associated with one round trip duration of satellite propagation). In some instances, an exponential moving average (EMA) of a stream burst may be calculated and used. Alternatively, or in combination with an EMA calculation, computer 16 may determine a long-term (LT) evaluation of the CQI determined in Equation (7) using a time-varying function such as the one defined by Equation (8).

$$CQI_{LT}(t) = \alpha_{LT} * CQI(t) + (1-\alpha_{LT}) * CQI_{LT}(t-1), \quad \text{Equation (8)}$$

wherein t=time, wherein $\alpha_{LT}$ is a predetermined constant (e.g., such as 0.25).

In process 200, $CQI_{LT}(t)$ may be used to determine whether conditions at a particular terminal 12 is suitable for a faster or slower symbol rate. As shown above, the CQI (e.g., $CQI_{NORM}$) parameter may be based (at least in part) on the respective PHR parameter reported to the computer 16 by the respective terminal 12.

As discussed above, in block 218, computer 16 may determine the normalized CQI. According one example, a normalized CQI ($CQI_{NORM}$) is defined by Equation (9)—e.g., by using the CQI of Equation (7) and/or Equation (8).

$$CQI_{NORM}(dB) = CQI_{LT}(t) + \Delta\gamma_K, \quad \text{Equation (9):}$$

wherein $\Delta\gamma_K$ is an interference compensation parameter, as discussed above; e.g., $\Delta\gamma_K$ may be considered a correction value.

More particularly, computer 16 may determine an interference value (e.g., an absolute, not relative value) for a particular inroute channel (e.g., a reference inroute channel) within an inroute group. Using the interference value associated with a reference inroute channel can improve processing time by minimizing recurring calculations. The interference compensation parameter (e.g., $\gamma_K$ (dB)) may represent a relative difference between the interference value of the reference inroute channel and the interference values of the other inroute channels in the inroute group. It should be appreciated that the interference compensation parameter ($\Delta\gamma_K$) is independent of the terminal's symbol rate. Thus, according to one example, a value of parameter $\Delta\gamma_K$ can be associated with an entire super inroute group (SIG), or even an entire inroute set (e.g., such as set 52).

In block 218, the CQI or $CQI_{NORM}$ may be determined for all inroute channels in the inroute group (and or set). As described below, computer 16 may sequence the inroute channels according to their respective channel quality parameters. In this manner, the computer 16 can identify which inroute channels have the highest or lowest quality indication and are most suitable for moving between SIG LO (e.g., SIG 512 k) and SIG HI (e.g., SIG 1 M).

In block 218, computer 16 further may determine a quality parameter used to determine whether to move a terminal 12 between neighboring SIGs. This quality parameter may be based at least partially on a $CQI_{MIN}$ which may be determined used Equation (9.1) below.

$$CQI_{MIN} = E_S/N_0 + 10*\log_{10}(S), \quad \text{Equation (9.1)}$$

wherein $CQI_{MIN}$ is a minimum CQI value based on a minimum or target $E_S/N_0$ of a most conservative coding rate with corresponding modulation (e.g., QPSK) for a particular symbol rate (e.g., of the respective SIG). It should be appreciated that $CQI_{MIN}$ may differ for different SIGs (e.g., as the respective symbol rates of SIGs correspondingly differ).

In blocks 220, 222, computer 16 may determine two threshold CQI parameters. In block 220, computer 16 determines a threshold CQI for entering SIG LO ($THR_{CQI.ENTRY.LO}$), and in block 222, computer 16 determines a threshold CQI for entering SIG HI ($THR_{CQI.ENTRY.HI}$).

$$THR_{CQI.ENTRY.LO} = CQI_{MIN} + \text{margin}_1 \quad \text{Equation (10):}$$

Threshold $THR_{CQI.ENTRY.LO}$ may include a minimum quality parameter ($CQI_{MIN}$) for moving a terminal 12 from SIG HI to neighboring SIG LO—e.g., it may be based on the slowest code rate (SYMCOD) using quadrature phase shift keying (QPSK) modulation at a given symbol rate. A margin ($\text{margin}_1$) may be added to $CQI_{MIN}$ to avoid so-called ping-ponging a terminal 12 between neighboring SIGs (e.g., moving the terminal 12 back and forth, when the CQI of the terminal makes it suitable for operation in either SIG). Margins may or may not be dependent on the given symbol rate. To illustrate: $CQI_{MIN}$ for an inroute in SIG 2 M (QPSK, ½) may be 69.1 dB, and $CQI_{MIN}$ for the inroute to use SIG 1 M (QPSK, 9/10) may be 70.0 dB. And for example, if $\text{margin}_1 = 1.0$ dB, then the terminal 12 would need 69.1 dB+1.0 dB (or 70.1 dB) to enter SIG 2 M; however, if the terminal CQI is only 70.0 dB, the terminal 12 would remain within SIG 1 M. According to at least some examples (and as described more below), the terminal 12 may override an instruction from computer 16 to move to a higher SIG—e.g., if the terminal 12 detects too many so-called burst-errors, the terminal may determine to not move to SIG 1 M from SIG 512 k even though it ultimately receives an instruction from computer 16 to do so.

$$THR_{CQI.ENTRY.HI} = CQI_{MIN} + \text{margin}_2 \quad \text{Equation (11):}$$

$THR_{CQI.ENTRY.HI}$ may be similar to $THR_{CQI.ENTRY.LO}$, except that $THR_{CQI.ENTRY.HI}$ may include the quality parameter $CQI_{MIN}$ and a different margin ($\text{margin}_2$)—e.g., for moving a terminal 12 from SIG LO to neighboring SIG HI—e.g., it may be based on the slowest code rate (SYMCOD) for operating at a given symbol rate. Block 220 and/or block 222 may be performed by computer 16 at any suitable time during process 200.

In block 224, computer 16 may determine one or two backlog volume thresholds—a threshold ($THR_{BL.LO}$) associated with the respective SIG LO and/or a threshold ($THR_{BL.HI}$) associated with the neighboring and corresponding SIG HI. Thresholds $THR_{BL.LO}$, $THR_{BL.HI}$ may be predetermined and constant values—e.g., stored in computer memory 34. A respective terminal 12 may need to have its corresponding backlog greater than or equal to the backlog threshold for moving up or down between neighboring SIGs.

In another example, thresholds $THR_{BL.LO}$, $THR_{BL.HI}$ may be determined during process 200. Processing efficiency may improve when computer 16 calculates the thresholds, rather than looking them up in a table (e.g., in memory 34) for at least some of the same reasons stated above. See Equations (12) and (13).

$$THR_{BL.LO} = \max(0, SIG_{LO.MEAN} + d*SIG_{LO.STD}), \quad \text{Equation (12):}$$

wherein $SIG_{LO.MEAN}$ is an average backlog of all the terminals in a given SIG LO, wherein $SIG_{LO.STD}$ is a standard deviation from the average.

$$THR_{BL.HI} = \max(0, SIG_{HI.MEAN} + d*SIG_{HI.STD}),\quad \text{Equation (13):}$$

wherein $SIG_{HI.MEAN}$ is an average backlog of all the terminals in a given SIG HI, wherein $SIG_{HI.STD}$ is a standard deviation from the respective average.

In block 226, computer 16 may determine a threshold quantity of channel change requests (e.g., $THR_{MAX.CH.CHG}$). This parameter may limit the number of attempts the computer 16 makes to instruct terminals 12 to change channels (and/or consequently change SIGs) for a so-called iteration. In one example, this value is predetermined. In others, it is not. It will be appreciated that instructing terminal 12 to change channels has an efficiency cost; therefore, there exists a trade-off (e.g., between how many terminals 12 to instruct to change channels and enhancing inroute channel balancing). Thus, by limiting the quantity of instructions/changes (e.g., using $THR_{MAX.CH.CHG}$), computer 16 may ensure: (a) that no infinite control loop will occur, and (b) that the number of changes will not become a detriment to balancing efficiency.

As will be explained more below, computer 16 may determine first whether to move terminals 12 to or from SIG LO (from/to a corresponding SIG HI). This may be a first iteration. Then, computer 16 may re-designate SIG LO and SIG HI (e.g., SIG LO may be SIG 1 M while SIG HI may be SIG 2 M); then computer 16 again may determine whether to move terminals 12 to or from SIG LO (from/to a corresponding SIG HI). This may be a second iteration. This pattern may repeat with addition iterations (e.g., between SIG 2 M and SIG 4 M and/or by looping back to the first iteration again).

In block 228, computer 16 may determine a percent difference between the actual density ($BL_{LO.ACTUAL}$) of the current SIG LO (e.g., SIG 512 k) and its corresponding target density ($BL_{LO.TARGET}$). The percent difference may be determined using Equation (14). Thereafter, computer 16 proceeds to block 240.

$$\text{Percent difference} = |BL_{LO.ACTUAL} - BL_{LO.TARGET}| / BL_{LO.TARGET} \quad \text{Equation (14):}$$

In block 240, computer 16 may compare the percent difference with a tolerance threshold $THR_{TOL}$). If computer 16 determines that the percent difference is less than or equal to the tolerance threshold $THR_{TOL}$, then process 200 proceeds to block 256 (discussed below). Otherwise, process 200 proceeds to block 242.

In block 242, computer 16 determines whether the percent difference is greater than the tolerance threshold ($THR_{TOL}$) or less than a negative tolerance threshold ($-THR_{TOL}$). If the percent difference is greater than the tolerance threshold $THR_{TOL}$, process 200 proceeds to block 244. In this case, computer 16 determines to instruct one or more terminals to move out of the current SIG LO (e.g., 512 k) to the SIG HI. However, if the percent difference is less than the negative tolerance $-THR_{TOL}$, then process 200 proceeds to block 270. In this latter case, computer 16 determines to instruct one or more terminals to move into the current SIG LO (e.g., on the first iteration, into SIG 512 k) from the SIG HI.

In block 244, process 200 determines the current backlog volume ($VOL_{BL.LO}$) by summing all the backlog parameters in SIG LO. For example, as discussed above, each terminal via its inroute channel may report its backlog volume, and computer 16 may store these parameter values in memory 34. Thus, to determine the current backlog volume ($VOL_{BL.LO}$), computer 16 may sum the backlog parameters associated with SIG LO.

In block 246, computer 16 may determine a descending order of the terminal identifiers (of the current SIG LO) based on their respective channel quality parameters—e.g., generating and indexing a list of inroute channels (e.g., by terminal identifier), wherein the first ordered inroute channels have the largest normalized CQI ($CQI_{NORM}$) (within SIG LO) and the last ordered inroute channels in the list have the smallest $CQI_{NORM}$) (within SIG LO). And indexed value may be stored in computer memory 34 as well (e.g., in the data array discussed in block 204). Exemplary indices include: 12(1), 12(2), 12(3), . . . , and 12(i), wherein "i" is a quantity of inroute channels associated with SIG LO (or a quantity of terminals 12 connected to computer 16 at a target symbol rate—e.g., associated with SIG 512 k).

In block 248 which follows, computer 16 determines whether to instruct a terminal 12 to move to a channel having a faster target symbol rate. More specifically, computer 16 considers the first (or next) indexed inroute—thus, e.g., initially, computer 16 will consider the inroute channel associated with 12(1). On the next loop of process 200 (discussed below), computer 16 will consider the inroute channel associated with 12(2), etc. When computer 16 determines that $CQI_{NORM}(1)$ (i.e., the normalized CQI associated with 12(1)) is greater than or equal to the threshold CQI for entering SIG HI ($THR_{CQI.ENTRY.HI}$) and also when computer 16 determines that the current backlog volume of SIG LO ($VOL_{BL.LO}$) is greater than the backlog volume threshold ($THR_{BL.LO}$), then computer 16 determines that conditions are favorable to move terminal 12(1) out of the current SIG LO. Thus, when both conditions are true, then computer 16 proceeds to block 250. If either of the conditions are not true, process 200 proceeds to block 254 (discussed below).

In block 250, computer 16 sends outroute data to the respective terminal. The outroute data includes an instruction to change channels to a channel associated with the current SIG HI (e.g., 1 M). It should be appreciated that the respective terminal may receive this instruction and move; it may receive and ignore this instruction (e.g., based on programming at the terminal causing it to override or ignore the instruction under certain conditions), it may not receive the instruction (e.g., due to a link failure or the like), etc. Computer 16 continues to attempt to balance terminal traffic regardless of whether the respective terminal obeys the instruction—as it is likely that enough of the terminals 12 will obey such instructions that computer 16 can affect traffic or inroute channel balancing.

In block 252 which follows, computer 16 determines whether the quantity of channel change requests in the present iteration is equal to the predetermined maximum (e.g., equal to $THR_{MAX.CH.CHG}$, discussed above in block 226). If the quantity of change requests equals $THR_{MAX.CH.CHG}$, then process 200 proceeds to block 254.

Otherwise, process 200 loops back and repeat at least a portion of blocks 244-252—e.g., sending additional instructions when both the channel quality parameter of the respective terminal is sufficiently large and the backlog volume of the current SIG LO is sufficiently high. While repeating blocks 244-252, computer 16 may determine that terminals which were sent channel-change instructions have moved to different channels (e.g., not in the current SIG LO). Consequently, while repeating blocks 244-252, computer 16 the backlog volume (($VOL_{BL.LO}$) may decrease. Similarly, as the computer 16 considers terminals in order of the channel-quality indexing, the channel quality $CQI_{NORM}(i)$ of each consecutively-indexed terminal also may decrease. Ultimately, computer 16 may determine in block 248 that both conditions are not met, and this loop within process 200 may end—e.g., and process 200 proceeds to block 254.

FIG. 2C illustrates that block 254 may include identifying and/or storing which channel change instructions were sent and/or which actually occurred. For example, computer 16 may store in memory 34 and/or database 36 which inroute channels (or terminals) were instructed to change channels. Further, computer 16 may store in memory 34 and/or database 36 which inroute channels (or terminals) actually changed channels based on the instruction sent by computer 16.

Following block 254, in block 256, computer 16 may update the data array. This may occur as part of block 254 or may be a separate instruction executed by computer 16.

In block 258 which follows, computer 16 may provide an output based on the channel changes. This output may be statistical data to another computer, to a human technician (e.g., via any suitable display), or the like. Any output also may be stored by computer 16 in memory 34 and/or database 36. Block 258 is optional.

In block 260 which follows, using the updated data array, computer 16 may determine the first iteration is complete, and may designate a new pair of neighboring SIGs (a new SIG LO and a new SIG HI). Continuing with the example above, computer may designate SIG LO to be SIG 1 M and SIG HI to be SIG 2 M. In at least one example, the next pair of SIGs are the next neighboring pair of SIGs (having faster target symbol rates). Following block 260, process 200 may loop back to block 210 and repeat at least at least a portion of the process described above (e.g., of course, in looping back, the newly designated SIGs LO and HI are used instead). It should be appreciated that by initiating process 200 using the SIGs associated with slower symbol rates, overall traffic balancing may be achieved. More particularly, by starting with slower symbol rate SIGs, terminals 12 (having relatively large backlog volumes) may be moved from channels associated with faster symbol rates into channels associated with slower symbol rates—where the traffic is proportionately lower so that the respective backlog volumes may decrease. For example, a terminal 12 that is capable of transmitting at a faster symbol rate, but that must wait too long in a queue, may transmit data ultimately slower than if it had been permitted to transmit immediately (but at a slower symbol rate). It is anticipated—as part of process 200—that when the backlog volumes are decreased sufficiently, some of these same terminals 12 (e.g., moved to SIG LO) may move back to channels having higher symbol rates (e.g., back to SIG HI)—e.g., in accordance with programming of computing devices 46 at the respective terminals 12, and/or in accordance with process 200.

Returning to block 240, process 200 may not instruct terminals 12 to move. Note, when the absolute percent difference between the actual and target densities (of the current SIG LO) is determined by computer 16 to be less than or equal to the tolerance threshold ($THR_{TOL}$), then the process 200 may proceed directly to block 256—e.g., updating the data array (e.g., note: some terminals 12 may have moved based on their own internal programming since block 204 was executed last). Thereafter, it may proceed as described above—e.g., including designating new current SIGs LO and HI.

Returning to block 242, process 200 instead may instruct terminals 12 to move from the current SIG LO to the current SIG HI (e.g., where terminal 12 will communicate via a channel having a faster symbol rate). (Note: in the presently-described example (first iteration), the current SIG LO and SIG HI are 512 k and 1 M, respectively). In block 242, when the computer 16 determined that the percent difference was less than the negative tolerance threshold ($-THR_{TOL}$) (i.e., its absolute value was not less than or equal to $THR_{TOL}$ (see block 240) and it was not greater than $THR_{TOL}$ (see block 242), then the computer proceeded to block 270.

With respect to block 270, process 200 may determine a current backlog volume associated with the current SIG HI ($VOL_{BL.HI}$). This may be similar to block 244, except that the backlog parameters associated with the inroute channels of the current SIG HI are summed, rather than the backlog parameters of the current SIG LO. As discussed above, this block may be executed at any suitable time during process 200—not only following block 242.

Following block 270, in block 272, computer 16 may determine an ascending order of the terminal identifiers (of the current SIG HI) based on their respective channel qualities—e.g., generating and indexing a list of inroute channels (e.g., by terminal identifier), wherein the first ordered inroute channels have the smallest normalized CQI ($CQI_{NORM}$) (within the current SIG HI) and the last ordered inroute channels in the list have the largest $CQI_{NORM}$) (within the current SIG HI). And indexed value may be stored in computer memory 34 as well (e.g., in the data array discussed in block 204). Exemplary indices include: 12(1), 12(2), 12(3), . . . , and 12(i), wherein "i" is a quantity of inroute channels in SIG HI (or a quantity of terminals 12 connected to computer 16 at a target symbol rate—e.g., associated with SIG 1 M).

In block 274 which follows, computer 16 determines whether to instruct a terminal 12 to move to a channel having a slower target symbol rate (e.g., from the current SIG HI to the current SIG LO). More specifically, computer 16 considers the first and/or next indexed inroute channel (or respective terminal)—thus, e.g., initially, computer 16 will consider the inroute channel associated with 12(1). And as discussed above, on the next loop of this portion of process 200, computer 16 will consider the inroute channel associated with 12(2), etc. When computer 16 determines that $CQI_{NORM}(1)$ (i.e., the normalized CQI associated with 12(1)) is less than or equal to the threshold CQI for entering SIG LO ($THR_{CQI.ENTRY.LO}$) and also when computer 16 determines that the current backlog volume of SIG HI ($VOL_{BL.HI}$) is greater than the backlog volume threshold for SIG HI ($THR_{BL.HI}$), then computer 16 determines that conditions are favorable to move terminal 12(1) out of the current SIG HI (and into SIG LO). Thus, when both conditions are true, then computer 16 proceeds to block 276. If either of the conditions are not true, process 200 proceeds to block 254 (which was discussed above).

In block 276, computer 16 sends outroute data to the respective terminal. The outroute data includes an instruction to change channels to a channel associated with the current SIG LO (e.g., 512 k). It should be appreciated that the respective terminal may receive this instruction and move; it may receive and ignore this instruction (e.g., based on programming at the terminal causing it to override or ignore the instruction under certain conditions), it may not receive the instruction (e.g., due to a link failure or the like), etc. Computer 16 continues to attempt to balance terminal traffic regardless of whether the respective terminal obeys the instruction—as it is likely that enough of the terminals 12 will obey such instructions that computer 16 can affect traffic or inroute balancing.

In block 278 which follows, computer 16 determines whether the quantity of channel-change requests in the present iteration is equal to the predetermined maximum (e.g., equal to $THR_{MAX.CH.CHG}$, discussed above in block 226). If the quantity of change requests equals $THR_{MAX.CH.CHG}$, then process 200 proceeds to block 254. Otherwise, process 200 loops back and repeats at least a portion of blocks 270-278. In repeating at least a portion thereof, the backlog volume of SIG HI may be decreased and some channel quality parameters associated with the inroute channels of the current SIG HI may not be sufficiently low. Thus, ultimately (and similar to the discussion above), computer 16 will proceed to block 254. The process 200 here may proceed as described above—e.g., completing the first iteration.

It should be appreciated that process 200 may be repeated any number of times. Computer 16 may execute the process 200 using neighboring SIG pairs of 512 k and 1 M, then 1 M and 2 M, then 2 M and 4 M, then (looping back) SIG 512 k and SIG 1 M (again), 1 M and 2 M (again), etc. (And as described above, where different or higher symbol rate SIGs are formed, the process 200 may include such SIGs in the iterative loop.) Further, while process 200 is carried out, FIG. 4 illustrates that the terminals 12 may be falling back on their own 100 (dashed lines)—e.g., in accordance with their respective programming—bypassing channels associated with a neighboring SIG. For instance, a terminal 12—based on its programming—may move from SIG 4 M to any of SIG 2 M, SIG 1 M, or SIG 512 k. Similarly, a terminal 12—based on its programming—may move from SIG 2 M to either of SIG 1 M or SIG 512 k. However, according to at least one example of process 200, computer 16 may instruct terminals 12 (solid lines 110) to move to channels associated with slower symbol rates only via neighboring SIGs. Thus, to move a terminal 12 from a channel in SIG 4 M to SIG 512 k, computer 16 may be required to move it first to SIG 2 M, then from SIG 2 M to SIG 1 M, and then from SIG 1 M to SIG 512 k.

FIG. 4 also illustrates that computer 16 may be programmed to move some terminals 12 in the opposite direction—e.g., skipping over neighboring SIGs. For example, under certain circumstances, computer 16 may determine to move a terminal 12 from SIG 512 k directly to any of SIG 1 M, SIG 2 M, or SIG 4 M. According to one example, computer 16 sends an express instruction to a terminal 12 to move to the channel having a faster symbol rate (e.g., skipping the neighboring SIG) when the respective backlog volume parameter of the terminal is larger than a predetermined threshold.

According to another non-limiting example, computer 16 may move terminals based on additional criteria—e.g., associated with various virtual network enterprises and/or virtual network operators (VNOs). Thus, computer 16 may move terminals 12—not only based on a channel condition and/or terminal backlog—but also based on one or more of the following criteria: a user group priority, a user group subscription rate, a user group quality of service (QoS) value, or the like. As described below, one or more of these criteria may be used in combination with channel quality and/or backlog parameters to rank the terminals within a SIG (e.g., and thus, to move the terminal 12 to a neighboring or other SIG). Thus, e.g., among terminals having similar channel quality parameters, one or more of a user group priority, a user group subscription rate, or a user group quality of service (QoS) value may be used to further sort which of these terminals will be instructed to change inroute channels.

For example, computer 16 may store a priority value for at least some of the terminals; accordingly, computer 16 may send an instruction to the respective terminal 12 (before other like-situated terminals 12 within a respective SIG) based on its priority value, as well as its channel quality parameter and/or backlog parameter. Or for example, computer 16 may store a user group subscription rate for at least some of the terminals (e.g., according to how much a user of the terminal 12 pays for service); accordingly, computer 16 may send an instruction to the respective terminal 12 (before other like-situated terminals 12 within a respective SIG) based on its subscription rate, as well as its channel quality parameter and/or backlog parameter. Or for example, computer 16 may store a user group QoS value for at least some of the terminals (e.g., according to how much a user of the terminal 12 pays for service); accordingly, computer 16 may send an instruction to the respective terminal 12 (before other like-situated terminals 12 within a respective SIG) based on its QoS value, as well as its channel quality parameter and/or backlog parameter. The criteria cited above may be used in any suitable combination; in one non-limiting example, the computer 16 may determine to instruct a terminal 12 to change inroute channels based on one or more of a user group priority, a user group subscription rate, or a user group quality of service (QoS) value and not a consider the channel quality parameter and/or backlog parameter. Further, for example, computer 16 may evaluate whether to instruct any terminal 12 to move to a different inroute channel based on a user group priority, a user group subscription rate, a user group quality of service (QoS) value, a channel quality parameter, a backlog parameter, or any combination thereof.

Thus, there has been described a telecommunication system that includes a gateway computer that is programmed to: receive inroute data via a plurality of inroute channels, wherein each channel is associated with a wireless terminal; and, in order to balance traffic of inroute channels, instruct at least some of the terminals to change channels (e.g., to a channel with either a faster symbol rate or a slower symbol rate) based on a backlog indication (e.g., the terminal backlog of at least one portion of the inroute channels) and based on an indication of channel quality of the respective inroute channels.

In general, the computing systems and/or devices described may employ any of a number of computer operating systems, including, but by no means limited to, versions and/or varieties of Hughes proprietary operating and software systems, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing inroute and outroute communications between a gateway computer and a plurality of terminals.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising:
    a computer having a processor and memory storing instructions executable by the processor, the instructions including:
        for each of a plurality of terminals, to receive inroute data via one of a plurality of respective inroute channels;
        using the plurality of respective inroute channels, to determine a first super inroute group (SIG) of inroute channels and a second super inroute group (SIG) of inroute channels, wherein the determination of the first SIG and the second SIG is based on symbol rates of the plurality of respective inroute channels;
        to determine a channel quality value of a first inroute channel, of a first terminal, wherein the first inroute channel is one of the plurality of respective inroute channels, wherein the first terminal is one of the plurality of terminals;
        to determine a backlog volume of one of the first SIG or the second SIG; and
        based on determining the channel quality value of the first terminal and the backlog volume of the first SIG or the second SIG, to transmit, to the first terminal, first outroute data comprising an instruction to change to a different inroute channel of the first SIG or the second SIG,
        wherein the first SIG comprises one or more first inroute groups, wherein each of the first inroute groups comprise a first portion of the plurality of respective inroute channels each having a first common maximum symbol rate, wherein the second SIG comprises one or more second inroute groups, wherein each of the second inroute groups comprise a second portion of the plurality of respective inroute channels each having a second common maximum symbol rate that is different from the first common maximum symbol rate.

2. The system of claim 1, further comprising a satellite gateway that comprises the computer, wherein the gateway is coupled to a public or private communication network.

3. The system of claim 1, wherein the plurality of terminals are satellite terminals.

4. The system of claim 1, wherein the value is based at least partially on an actual transmission power used by the first terminal to communicate via the first inroute channel.

5. The system of claim 4, wherein the value further includes a potential transmission power that could have been used by the first terminal to communicate via the first inroute channel.

6. The system of claim 1, wherein the value is at least partially based on interference and noise of the first inroute channel.

7. The system of claim 1, wherein the instructions further include:
to determine a second channel quality value of a second inroute channel, of a second terminal, wherein the second terminal is one of the plurality of terminals;
to re-determine the backlog volume of the first or second SIG; and
based on determining the second channel quality value and based on the re-determined backlog volume, to determine to transmit, to the second terminal, second outroute data comprising an instruction to change to a different inroute channel of the first SIG or the second SIG.

8. The system of claim 1, wherein each of the plurality of respective inroute channels have multiple access of TDMA, FDMA, CDMA or SCMA and different symbol rates, such as one of the following symbol rates: 512 kilo-symbols-per-second, 1024 kilo-symbols-per-second, 2048 kilo-symbols-per-second, 4096 kilo-symbols-per-second, 6144 kilo-symbols-per-second, 8192 kilo-symbols-per-second, or 12288 kilo-symbols-per-second, wherein the first common maximum symbol rate of the first SIG is one of these symbol rates, wherein the second common maximum symbol rate of the second SIG is a different one of these symbol rates.

9. The system of claim 1, wherein the instructions further comprise: to transmit an instruction to change from the first SIG to an inroute channel of the second SIG based on determining that the channel quality value of the first terminal is higher than a threshold, wherein the second SIG comprises a faster symbol rate than the first SIG.

10. The system of claim 1, wherein the instructions further include: to determine a third SIG and a fourth SIG using the plurality of respective inroute channels; and using the channel quality value and backlog volume, to transmit the instruction to change to one of the third SIG or the fourth SIG, wherein a symbol rate of the third SIG is faster than the symbol rate of the second SIG, wherein a symbol rate of the fourth SIG is faster than the symbol rate of the third SIG.

11. The system of claim 1, wherein the instructions further include:
to determine a channel quality value for each of the plurality of terminals;
based on the respective channel quality values, to sort the plurality of terminals of the first SIG or the second SIG according to a descending order; and
after transmitting the first outroute data, then:
to re-determine the respective backlog volume; and
based on the sorting and the re-determining, to transmit second outroute data to a second terminal, wherein the second terminal is one of the plurality of terminals and is second in the descending order, wherein the second outroute data comprises an instruction to change to a different inroute channel.

12. The system of claim 1, wherein the instructions further include:
to determine a channel quality value for each of the plurality of terminals;
based on the respective channel quality values, to sort the plurality of terminals of the first SIG or the second SIG according to an ascending order; and
after transmitting the first outroute data, then:
to re-determine the respective backlog volume; and
based on the sorting and the re-determining, to transmit second outroute data to a second terminal, wherein the second terminal is one of the plurality of terminals and is second in the ascending order, wherein the second outroute data comprises an instruction to change to a different inroute channel.

13. The system of claim 1, wherein the instructions further include: to determine a tolerance threshold using a target backlog density and an actual backlog density; and to balance the plurality of terminals between the first SIG and the second SIG based on the threshold.

14. The system of claim 13, wherein the target backlog density is based on a weighting of the first SIG and the second SIG.

15. The system of claim 14, wherein the instructions further include: to determine a third SIG and a fourth SIG using the plurality of respective inroute channels, wherein the target backlog density is based on a weighting of at least the first SIG, the second SIG, the third SIG, and the fourth SIG.

16. A method, comprising:
for each of a plurality of terminals, receiving inroute data via one of a plurality of respective inroute channels;
using the plurality of respective inroute channels, determining a first super inroute group (SIG) of inroute channels and a second super inroute group (SIG) of inroute channels, wherein the determination of the first SIG and the second SIG is based on symbol rates of the plurality of respective inroute channels;
determining a channel quality value of a first inroute channel, of a first terminal, wherein the first inroute channel is one of the plurality of respective inroute channels, wherein the first terminal is one of the plurality of terminals;
determining a backlog volume of one of the first SIG or the second SIG; and
based on determining the channel quality value of the first terminal and the backlog volume of the first SIG or the second SIG, transmitting, to the first terminal, first outroute data comprising an instruction to change to a different inroute channel of the first SIG or the second SIG.

17. The method of claim 16, further comprising: transmitting an instruction to change from the first SIG to an inroute channel of the second SIG based on determining that the channel quality value of the first terminal is higher than a threshold, wherein the second SIG comprises a faster symbol rate than the first SIG.

18. The method of claim 16, further comprising:
determining a second channel quality value of a second inroute channel, of a second terminal, wherein the second terminal is one of the plurality of terminals;
re-determining the backlog volume of the first SIG or the second SIG; and
based on determining the second channel quality value and based on re-determining the backlog volume, determining to transmit, to the second terminal, second outroute data comprising an instruction to change to a different inroute channel of the first SIG or the second SIG.

19. The method of claim 16, further comprising:
performing at least one of a first set of instructions or a second set of instructions, wherein the first set of instructions comprise:
determining a channel quality value for each of the plurality of terminals;
based on the respective channel quality values, sorting the plurality of terminals of the first SIG or the second SIG according to a descending order; and
after transmitting the first outroute data, then:
re-determining the respective backlog volume; and
based on the sorting and the re-determining, transmitting second outroute data to a second terminal, wherein the second terminal is one of the plurality of terminals and is second in the descending order, wherein the second outroute data comprises an instruction to change to a different inroute channel, and wherein the second set of instructions comprise:

determining a channel quality value for each of the plurality of terminals;

based on the respective channel quality values, sorting the plurality of terminals of the first SIG or the second SIG according to an ascending order; and after transmitting the first outroute data, then:
re-determining the respective backlog volume; and
based on the sorting and the re-determining, transmitting second outroute data to a second terminal, wherein the second terminal is one of the plurality of terminals and is second in the ascending order, wherein the second outroute data comprises an instruction to change to a different inroute channel.

20. A system, comprising:

a computer having a processor and memory storing instructions executable by the processor, the instructions including:

to receive inroute data via an inroute channel of a first terminal;

to determine a first super inroute group (SIG) of inroute channels and a second super inroute group (SIG) of inroute channels, wherein the determination of the first SIG and the second SIG is based on symbol rates of a plurality of inroute channels, wherein the plurality of inroute channels includes the inroute channel of the first terminal;

to determine, for the first terminal, at least one of: a user group priority, a user group subscription rate, a user group quality of service (QoS) value, a channel quality parameter, or a backlog parameter; and based on determining at least one of: the respective user group priority, the respective user group subscription rate, the respective user group quality of service (QoS) value, the respective channel quality parameter, or the respective backlog parameter, to transmit, to the first terminal, outroute data comprising an instruction to change to a different inroute channel of the first SIG or the second SIG.

* * * * *